(12) United States Patent
Mahalatkar et al.

(10) Patent No.: US 10,480,534 B2
(45) Date of Patent: Nov. 19, 2019

(54) SUPERCHARGER OUTLET RESONATOR (71) Applicant: Eaton Corporation, Cleveland, OH (US)

(72) Inventors: Kartikeya K. Mahalatkar, Pune (IN); Girish Sudhir Kulkarni, Pune (IN); Sunil Kumar Kunche, Pune (IN); Andrew Scott Meyers, Marshall, MI (US); Michael J. Froehlich, Marshall, MI (US); Matthew Gareld Swartzlander, Battle Creek, MI (US)

(73) Assignee: Eaton Intelligent Power Limited, Dublin (IE)

( * ) Notice: Subject to any disclaimer, the term of this patent is extended or adjusted under 35 U.S.C. 154(b) by 430 days.

(21) Appl. No.: 15/312,641

(22) PCT Filed: May 19, 2015

(86) PCT No.: PCT/US2015/031634
§ 371 (c)(1),
(2) Date: Nov. 19, 2016

(87) PCT Pub. No.: WO2015/179444
PCT Pub. Date: Nov. 26, 2015

(65) Prior Publication Data
US 2017/0204881 A1 Jul. 20, 2017

(30) Foreign Application Priority Data
May 19, 2014 (IN) .......................... 1321/DEL/2014

(51) Int. Cl.
F04D 29/66 (2006.01)
F02M 35/12 (2006.01)
(Continued)

(52) U.S. Cl.
CPC ............ *F04D 29/665* (2013.01); *F02B 33/38* (2013.01); *F02B 33/40* (2013.01);
(Continued)

(58) Field of Classification Search
CPC ......... F02M 35/10157; F02M 35/1255; F02M 35/1216; F02M 35/1266; F02M 35/1288;
(Continued)

(56) References Cited

U.S. PATENT DOCUMENTS 4,371,053 A 2/1983 Jones
4,859,158 A 8/1989 Weinbrecht
(Continued)

FOREIGN PATENT DOCUMENTS

CN 103382910 A 11/2013
CN 103696968 A 4/2014
(Continued)

OTHER PUBLICATIONS

Welabrecht, John E. "The High-Ratio Circulating Compressor," International Compressor Engineering Conference, Purdue University, 1988, pp. 1-9.

*Primary Examiner* — Jesse S Bogue
(74) *Attorney, Agent, or Firm* — Mei & Mark, LLP (57) ABSTRACT A supercharger outlet resonator comprises a housing, a first surface comprising a first opening and a housing axis bisecting the first opening, and a second surface comprising a second opening, the second surface located parallel to the first surface. A channel is perpendicular to the housing axis and connects the first opening to the second opening. The channel comprises at least one sidewall. An envelope is fluidly separated from the channel by the at least one sidewall, the envelope at least partially surrounds the channel, and the envelope extends from the first surface to the second surface. The envelope comprises a third opening and
(Continued)

at least one second sidewall. A noise-reducing material located on the housing.

29 Claims, 10 Drawing Sheets

(51) Int. Cl.
| | |
|---|---|
| *F02B 33/38* | (2006.01) |
| *F04D 25/02* | (2006.01) |
| *F02B 33/40* | (2006.01) |
| *F02M 35/10* | (2006.01) |
| *F04D 17/10* | (2006.01) |
| *F04C 29/06* | (2006.01) |
| *F04C 18/16* | (2006.01) |
| *F02B 29/04* | (2006.01) |
| *F04C 29/04* | (2006.01) |
| *F04C 29/12* | (2006.01) |
| *F04C 18/12* | (2006.01) |

(52) U.S. Cl.
CPC .. *F02M 35/10157* (2013.01); *F02M 35/1216* (2013.01); *F02M 35/1255* (2013.01); *F02M 35/1266* (2013.01); *F02M 35/1288* (2013.01); *F04C 18/16* (2013.01); *F04C 29/06* (2013.01); *F04D 17/10* (2013.01); *F04D 25/024* (2013.01); *F04D 29/664* (2013.01); *F02B 29/0406* (2013.01); *F04C 18/126* (2013.01); *F04C 29/042* (2013.01); *F04C 29/12* (2013.01); *F04C 2240/30* (2013.01); *F05D 2220/40* (2013.01); *Y02T 10/144* (2013.01)

(58) Field of Classification Search
CPC ........ F04C 29/06; F04C 18/126; F04C 18/16; F04C 2240/30; F04C 29/042; F04C 29/12; F02B 29/0406; F02B 33/38; F02B 33/40; F04D 17/10; F04D 25/024; F04D 29/664; F04D 29/665; F05D 2220/40; Y02T 10/144

See application file for complete search history.

(56) References Cited

U.S. PATENT DOCUMENTS

| | | | |
|---|---|---|---|
| 5,613,478 A * | 3/1997 | Widmann | F02B 33/446 |
| | | | 123/564 |
| 5,902,970 A | 5/1999 | Ferri | |
| 5,979,598 A | 11/1999 | Wolf | |
| 6,589,034 B2 * | 7/2003 | Vorwerk | F04C 29/0035 |
| | | | 418/15 |
| 6,874,486 B2 * | 4/2005 | Prior | F01C 11/008 |
| | | | 123/559.1 |
| 6,983,820 B2 | 1/2006 | Boast et al. | |
| 7,584,821 B2 | 9/2009 | Prior et al. | |
| 7,604,467 B2 * | 10/2009 | Prior | F02B 33/38 |
| | | | 123/559.1 |
| 7,934,581 B2 | 5/2011 | Kim et al. | |
| 8,056,543 B2 * | 11/2011 | Prior | F02B 33/38 |
| | | | 123/559.1 |
| 8,316,813 B2 | 11/2012 | Prior | |
| 8,408,357 B2 | 4/2013 | Cheung | |
| 8,418,804 B1 | 4/2013 | Hawwa | |
| 9,512,834 B2 * | 12/2016 | Streeter | F04C 29/061 |
| 2003/0077195 A1 * | 4/2003 | Okada | F04C 29/04 |
| | | | 418/83 |
| 2008/0060622 A1 | 3/2008 | Prior | |
| 2010/0193282 A1 | 8/2010 | Kim et al. | |
| 2011/0061970 A1 | 3/2011 | Caliskan | |
| 2011/0083647 A1 | 4/2011 | Hansen et al. | |
| 2012/0020824 A1 * | 1/2012 | Huang | F01C 1/086 |
| | | | 418/157 |
| 2015/0198150 A1 | 7/2015 | Streeter | |
| 2018/0306191 A1 * | 10/2018 | Kim | F04C 29/063 |

FOREIGN PATENT DOCUMENTS

| | | |
|---|---|---|
| CN | 103696968 B | 6/2017 |
| DE | 1133500 B | 7/1962 |
| DE | 10248448 A1 | 4/2003 |
| DE | 102007046204 A1 | 4/2009 |
| DE | 102010010031 A1 | 9/2011 |
| EP | 1865188 A1 | 12/2007 |
| JP | 2005/214048 A | 8/2005 |
| WO | WO-2014/051937 A1 | 4/2014 |
| WO | WO-2016/073703 A1 | 5/2016 |

* cited by examiner

SUPERCHARGER OUTLET RESONATOR

This is a § 371 National Stage entry of Application No. PCT/US2015/031634, filed May 19, 2015, which claims the benefit of priority of Indian Provisional Patent Application 1321/DEL/2014 filed May 19, 2014 which is incorporated herein by reference.

FIELD

This application relates to a supercharger outlet resonator.

BACKGROUND

A supercharger can be implemented to supply compressed air to a combustion engine. When the air is compressed more air can be supplied, enabling a vehicle to produce more power. There are different kinds of superchargers available, including Comprex, Roots type, twin-screw, and centrifugal. They differ in the way that air is compressed and moved to the intake manifold of the engine.

The Roots type supercharger is a positive displacement pump that forces air around the outer circumference of rotors and blows the air into the manifold. Therefore, a Roots type supercharger is sometimes called a "blower." More specifically, the Roots type supercharger has two counter-rotating lobed rotors. The two rotors trap air in the gaps between rotors and push it against the housing as the rotors rotate towards the outlet/discharge port into the engine's intake manifold. By moving air into the manifold at a higher rate than the engine consumes it, pressure is built.

Because of its simple design, the Roots type supercharger is widely used. However, the Roots type supercharger has some disadvantages. When the chamber of trapped air is opened to the engine's intake manifold, the pressurized air in the engine's intake manifold reverse-flows according to thermodynamic and fluid mechanic principles into the supercharger. Further, there could be a leakage of air between the rotors due to gaps, or leakage due to gaps between the rotor lobes and housing, the gaps supplied for thermal expansion tolerances. Both reversion of air and air leakage contribute to the thermal inefficiencies of the Roots type supercharge. And, due to its nature to produce high discharge temperatures, it can take away from the engine performance. For example, when the temperature of discharged air is increased, it can cause detonation, excessive wear, or heat damage to an engine.

In many positive displacement compression devices, such as reciprocating compressors, the pressure is increased by reducing the volume occupied by gas. For example, a piston physically compresses a large volume of gas into a smaller volume to increase pressure. However in a Roots device there is no mechanism like a piston to compress the gas. The Roots blower scoops the air from a low pressure suction side and moves this air to the high pressure outlet side. When the low pressure air scooped by the Roots supercharger comes in contact with the high pressure outlet side, then a backflow event takes place whereby the high pressure air from the outlet backflows into the supercharger to compress the low pressure air into higher pressure air. Thus the compression of air in the supercharger happens through this backflow event. This also heats up the compressed low pressure air to a higher temperature based on thermodynamic principles. After compression of the air, the blades of the Roots supercharger squeeze the compressed air out of the supercharger into the high pressure outlet side.

Typically, Roots superchargers use hot high pressure air available at the outlet for the backflow event. However, it is possible to cool the Roots compressor by using relatively colder high pressure air available after an intercooler. But recirculating the cooled high pressure air during this backflow event can created undesirable noise, vibration, and harshness.

SUMMARY

The disclosure overcomes the above disadvantages and improves the art by using noise-reducing material as a supercharger outlet resonator to reduce the noise, vibration, and harshness of air recirculating from the supercharger outlet.

A supercharger outlet resonator comprises a housing, a first surface comprising a first opening and a housing axis bisecting the first opening, and a second surface comprising a second opening, the second surface located parallel to the first surface. A channel is perpendicular to the housing axis and connects the first opening to the second opening. The channel comprises at least one sidewall. An envelope is fluidly separated from the channel by the at least one sidewall, the envelope at least partially surrounds the channel, and the envelope extends from the first surface to the second surface. The envelope comprises a third opening and at least one second sidewall. A noise-reducing material located on the housing.

A supercharger assembly comprises a supercharger and the above supercharger outlet resonator. The supercharger comprises a housing. The housing comprises an inlet plane comprising an inlet, an outlet plane perpendicular to the inlet plane, the outlet plane comprising an outlet, and a rotor bore connected between the inlet and the outlet. At least one pair of backflow ports is in one of the inlet plane or the outlet plane. The at least one pair of backflow ports is fluidly connected to the rotor bore.

An alternative supercharger assembly comprises a supercharger and the above supercharger outlet resonator. The supercharger comprises a housing. The housing comprises an inlet plane comprising an inlet and a backflow compartment, an outlet plane perpendicular to the inlet plane, the outlet plane comprising an outlet, and a rotor bore connected between the inlet and the outlet. A pair of axial backflow ports fluidly connect the backflow compartment to the rotor bore. A supercharger outlet resonator comprises a noise-reducing perforated material in the backflow compartment.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

DETAILED DESCRIPTION

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures.

Figure 1A:
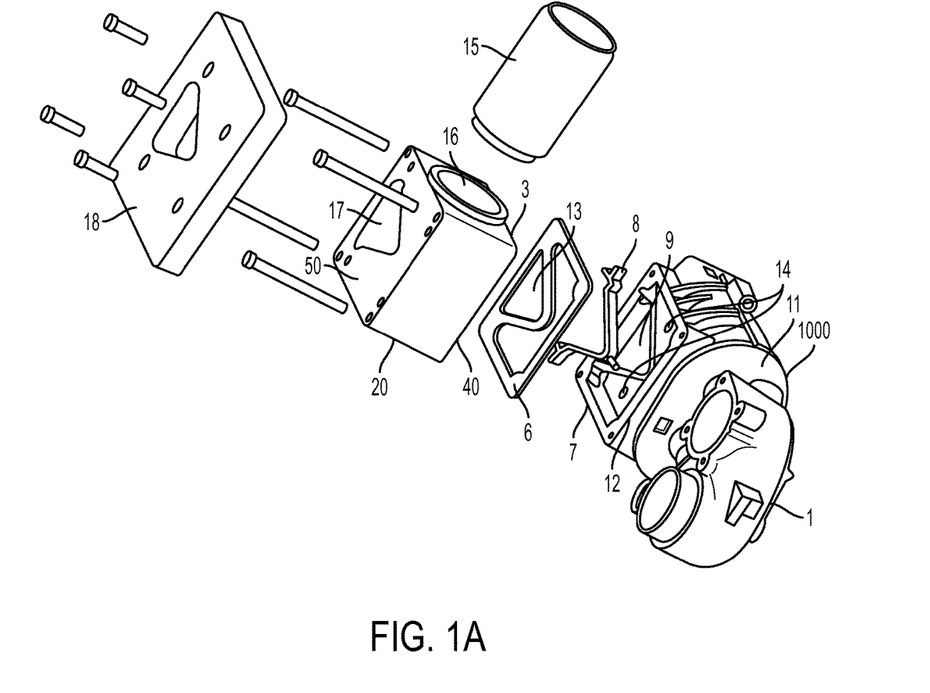
FIGS. 1A-1C are views of a supercharger assembly.
Figure 1B:
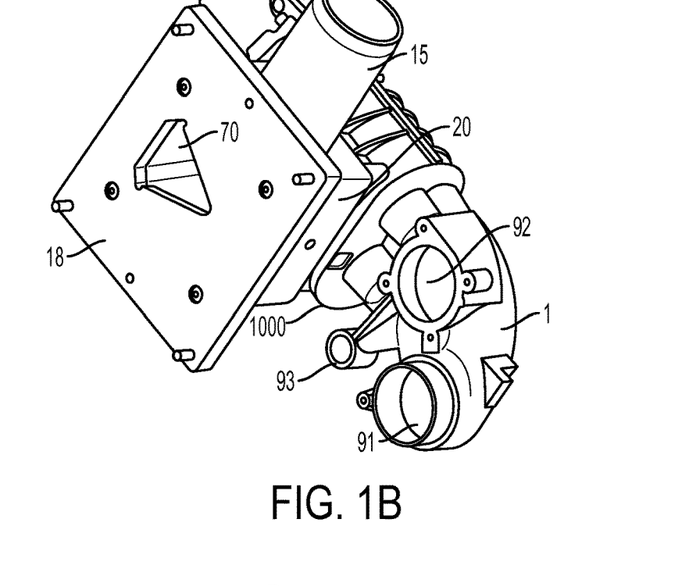
Figure 1C:
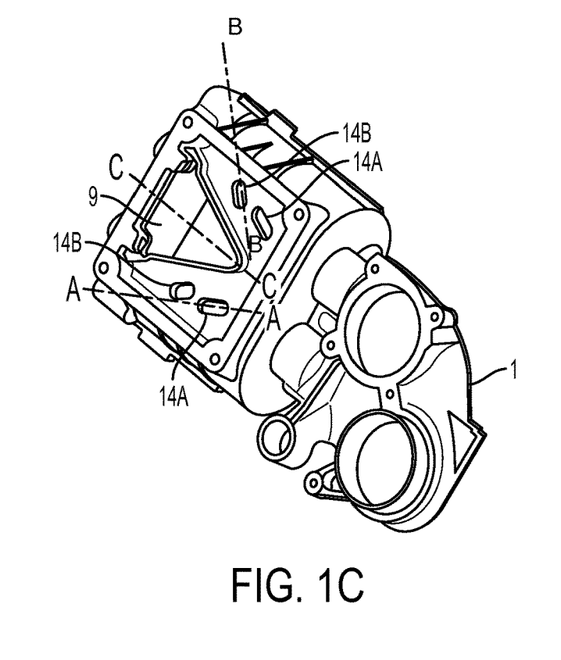

FIG. 1A shows an exploded view of a supercharger assembly, FIG. 1B shows an assembled supercharger assembly, and FIG. 1C shows an alternative outlet side configuration for a supercharger assembly. The supercharger assembly of FIGS. 1A-1C comprise a supercharger 1000 and a supercharger outlet resonator 20. Ducting 1 is also shown affiliated with the supercharger. The ducting 1 can comprise an inlet 91, a bypass port 92, and a mounting 93. The supercharger outlet resonator 20 has a housing 3, a first surface 40, and a second surface 50. The first surface 40 abuts gasket 6, which abuts the outlet side 7 of the supercharger 1000. The gasket 6 can dampen vibrations caused by high pressure air flow through the supercharger outlet resonator 2 and can seal fluid from leaking between the outlet side 7 and the housing 3. A metal insert 8 can be used, if necessary, to create an air-tight seal between the gasket 6 and the outlet 9. The metal insert 8 can comprise a metal tray with one or more layers of sealant poured or injected in to the tray. The sealant and tray combination directs air flow between the outlet 9 and the resonator 2. The metal insert can conform to the shape of the outlet 9. When the metal insert comprises sealant on both sides so that a sealant layer faces the outlet 9 and so that a sealant faces the first surface 40 of the housing, it is possible to reduce the complexity of the gasket 6. The gasket seals the perimeter of the first surface 40 to the perimeter of the outlet side 12 of the supercharger 1000.

The supercharger 1000 can be a Roots-style supercharger having an inlet side 11 and an outlet side 12. In this arrangement, the outlet 9 of supercharger 1 is triangular in shape. Outlet 9 is aligned with the triangular opening 13 in a gasket 6. The supercharger 1 also has backflow ports 14, which are in fluid communication with air recirculating through supercharger outlet resonator 20.

The supercharger outlet resonator 20 has a recirculation line 15 fitting into opening 16 that allows air to flow from an intercooler during a backflow event. The intercooler receives air from the outlet 9 and cools the air, which is ultimately returned to the supercharger 1000 through backflow ports 14, where the cooled high pressure air cools and mixes with low pressure air in supercharger 1000. By cooling the high pressure outlet air and recirculating it within the housing, the supercharger 1000 can ultimately compress air at a higher ratio. The provision of cooled air also reduces the outlet temperature of the blown air.

The supercharger outlet resonator 20 has a discharge port 17 that is aligned with both the triangular opening 13 in the gasket 6 and the outlet 9. The outlet air exits the discharge port 17, where it travels to the intercooler or to an engine for combustion. A mounting plate 18 can be used to fix the supercharger assembly to an engine. The mounting plate 18 can be adjusted in size and shape to better fit the supercharger assembly with engines of different dimensions. In the alternative, the mounting plate is integral with the second surface 50 so that the housing 3 is integrated with engine mounting features.

Figure 2A:
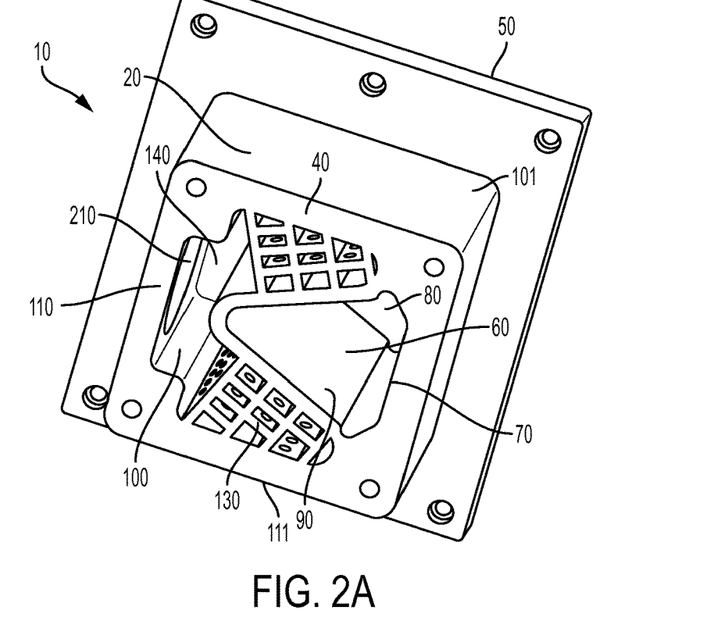
FIGS. 2A-2F are views of alternative supercharger outlet resonators.
Figure 2B:
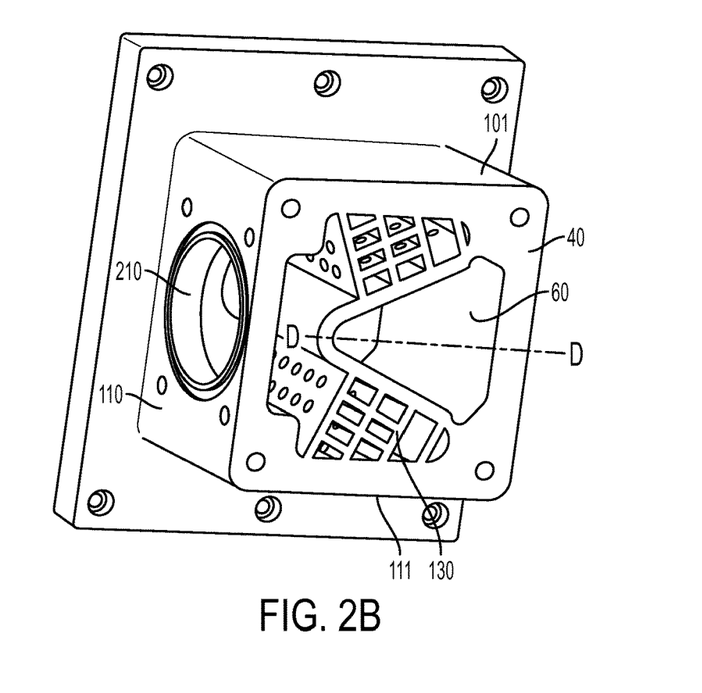

FIGS. 2A-2F show views of alternative supercharger outlet resonators. FIGS. 2A and 2B show an outlet resonator 10 comprising a housing 20, a first surface 40, a second surface 50, and a first opening 70. The first opening 70 can be triangular in shape, where it receives the air exiting a supercharger. A channel 60 connects the first opening 70 to the second opening 80. The channel 60 can extend to second opening 80, where the air exits the supercharger outlet resonator 10. Channel 60 comprises at least one sidewall 90 to separate the channel 60 from an envelope 100, which at least partially surrounds the channel 60. While a triangular channel is illustrated to connect to the triangular output of the supercharger housing, it is possible to use other rectilinear or rounded shapes to conform to the outlet shape of the supercharger.

The supercharger outlet resonator 10 comprises envelope 100 bounded by a first sidewall 101, second sidewall 110, and a third sidewall 111. A backwall 140 adjoins the second surface 50. While a rectilinear envelope 100 is shown, other shapes are possible, including rounded shapes. More or fewer sidewalls can be used to create the envelope. For example, the envelope can be triangular or cylindrical. A fourth sidewall 120 can be included on the resonator 10 to bound the channel 60.

A third opening 210 can be formed in second sidewall 110 to permit flow in to the envelope 100. Alternatively, the third opening 210 can be formed in the backwall 140 and connect through the second surface. In this orientation, the opening can couple to an intercooler on the same plane as the second opening 80 In yet another alternative, the third opening 210 can be in first sidewall 101 or third sidewall 111.

Figure 2C:
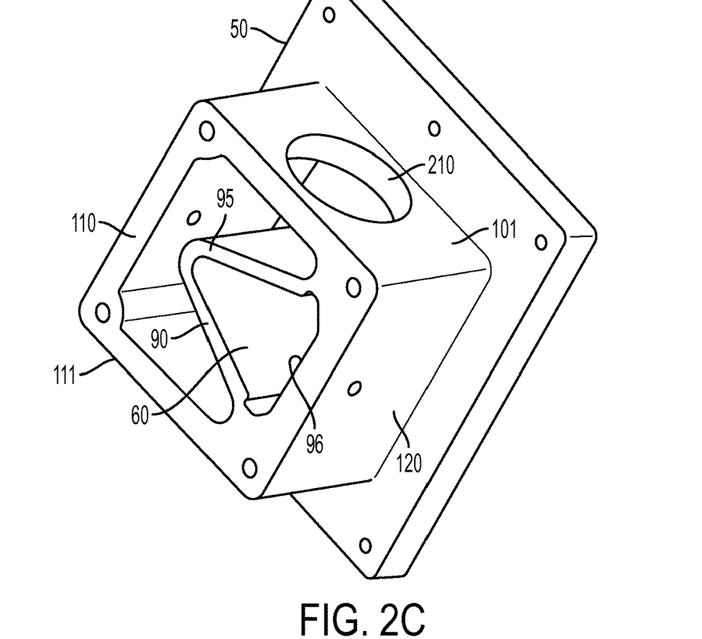
Figure 2D:
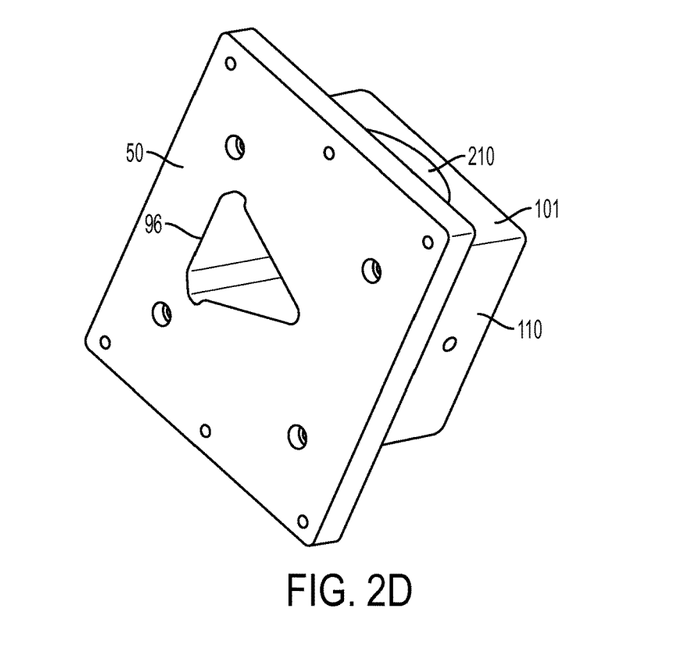

The envelope can be empty, as in FIGS. 2C & 2D, or the envelope 100 can include a noise-reducing material 130, as in FIGS. 2A & 2B. The envelope 100 at least partially surrounds the channel 60. At least one outlet sidewall 90 separates fluid from flowing from the channel 60 to the envelope 100 so that outlet air from the supercharger does not mix with cooled backflow air. This permits the pressure ratio of the supercharger to increase, because cooled air backflows to intracool the air moving in the supercharger. Hot outlet air does not contaminate the cooled backflow air at the outlet of the supercharger housing. In the triangular outlet examples shown, the at least one outlet sidewall 90 cooperates with a second outlet sidewall 95 and a third outlet sidewall 96 formed on fourth sidewall 120. Chamfering, grooves, steps, corners, rounded edges or other sidewall connections can be included between outlet sidewalls 90, 95 & 96, and they can be included between first through fourth sidewalls 101, 110, 111 & 120.

Figure 2E:
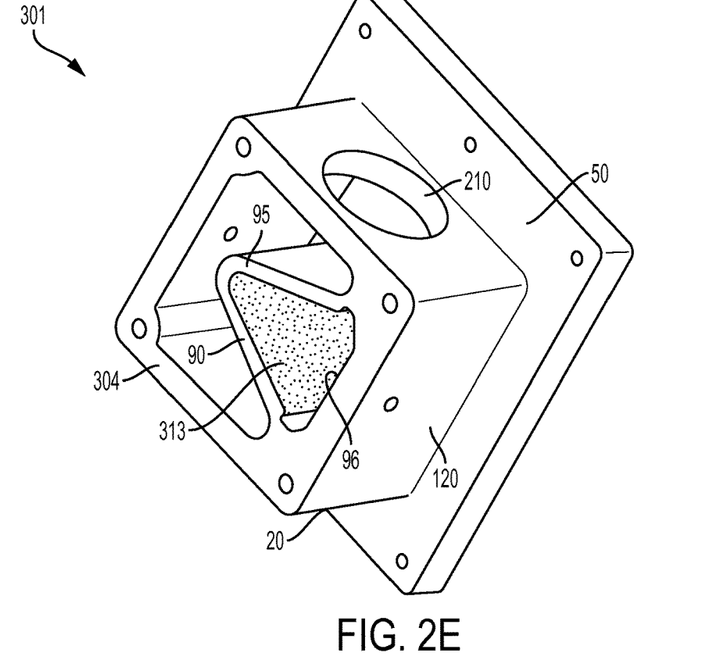
Figure 2F:
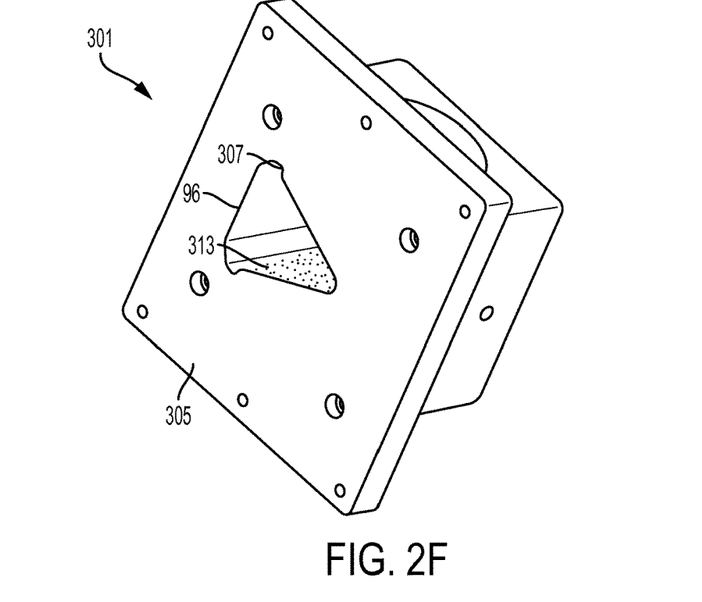

FIGS. 2E & 2F further include a noise reducing coating 313 on the outlet sidewalls, such as at least one outlet sidewall 90 and second outlet sidewall 95. It is possible to include or omit a coating on third outlet sidewall 96. The supercharger outlet resonator 301 comprises a first surface 304 and second surface 305. A noise-reducing material in the form of a coating 313 is located in channel 307. The coating 313 can be an aluminum coating, an absorber material coating, a laminated material, or a combination of an adhesive with a laminated material.

Returning to FIGS. 2A & 2B, the noise-reducing material 130 can be, and is not limited to, a perforated material, a micro-perforated panel, a corrugated material, or other noise-reducing material. As shown in FIGS. 2A & 2B, the noise-reducing material 130 can comprise intersecting and stacked layers of noise-reducing material 130. The number and orientation of the layers can vary based on the application. For example, as depicted in FIG. 1A, the backflow ports 14 can be mirror-image shapes about a center axis C of the outlet 9. However, because the lobes of the supercharger rotors could be twisted, the orientation and shape of the backflow ports can be varied to follow a lobe profile. For example, circular, square, rectangular, oval, oblong, and other shapes can be used for the backflow port shapes. Further, as shown in FIG. 1C, pairs of elongated backflow ports can be used in the form of first and second backflow port pairs 14A & 14B. Because the twisted lobes in the rotor bores can be mirror images, the backflow port locations are mirror images about the center axis C of the outlet 9. But, the first pair of backflow ports 14A have a port center axis A that is skewed with respect to the center axis C of the outlet 9. The second pair of backflow ports 14B have a port center axis B that is skewed with respect to the center axis C of the outlet 9 and that is also skewed with respect to the port center axis A for the first pair of backflow ports 14A.

The noise reducing material 130 can comprise sheets of material, such as metal, that are parallel or perpendicular to one of the center axis C or one of the port center axis A or B. The planes of the noise reducing material can alternatively be skewed with respect to the center axis C. Because the channel 60 comprises, at least in part, a shape matching the outlet 9, the planes of noise reducing material can be parallel, perpendicular, or skewed with respect to a housing axis D that bisects the first opening 40. The noise reducing material 130 can comprise mirror-image sets of perforated materials comprising planar sheets of material arranged askew with respect to the housing axis and wherein the mirror-image sets comprise a first set and a second set, and the first set is one of parallel or perpendicular with respect to the second set. The planar sheets of material can vary along the length of the housing axis D. The variation comprises one of spacing between planar sheets, perforation patterns in the sheets of material, parallel pattern of planar sheets, or perpendicular pattern of planar sheets.

Figure 5A:
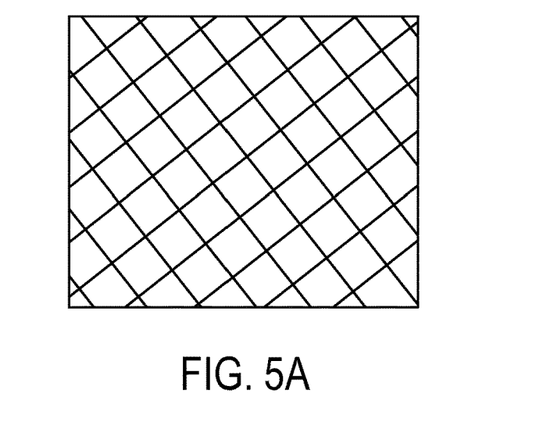
FIGS. 5A-5C are alternative examples of perforated material orientations.
Figure 5B:
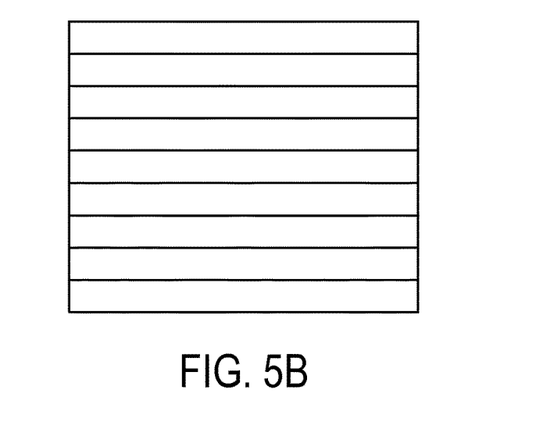
Figure 5C:
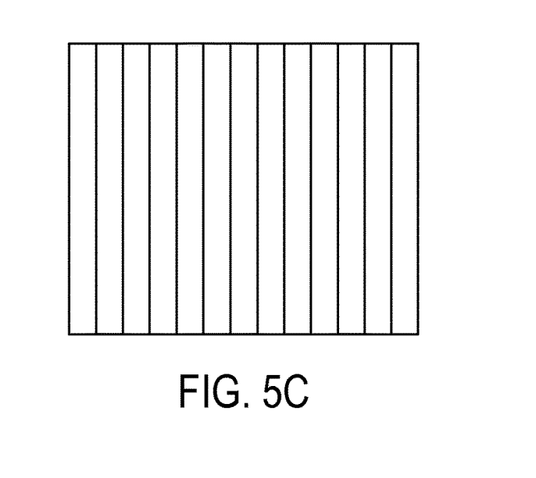

Thus the planes of the noise reducing material 130 can align with one or more of the twist of the lobes or the locations of the backflow ports 14, 14A or 14B. Plural planes can also intersect or be parallel as shown in FIGS. 5A-5C. As shown in FIGS. 2A & 2B, there can be a combination of parallel and intersecting planes, so that not all planes include an intersecting cross-piece. Stacking sheets of material in a frame, or interleaving slotted sheets, or abutting columns of sheet material are possible means to form a grid of noise reducing material.

FIGS. 4A-4D are non-limiting views of possible perforated materials, which can be used as a noise-reducing material to reduce noise, vibrations, and harshness. As illustrated, a uniform grid of perforations can be used. Staggered slots and honeycomb hole patterns are also possible perforation patterns, among others. It is additionally possible to mix a number of patterns on a sheet of material so that the damping characteristics change along the sheet of material. The perforated material can be tuned to damp particular frequencies, as by changing the space between sheets of material, changing the direction of sheets from parallel to perpendicular, or by changing the pattern, spacing, or size of perforations along the sheet material.

A micro-perforated panel is a sheet material with a one-millimeter or sub-millimeter hole diameter, while a perforated panel has a hole diameter greater than 1 millimeter. One example of a micro-perforated panel is MILLENNIUM METAL by American Acoustical Products, a division of Ward Process, Inc. Perforations in the micro-perforated panel can be circular, slits, or holes of other shapes.

The micro-perforated panel has been discussed above, but it is possible to replace the micro-perforated panel with other panels, such as a perforated panel, mesh panel, or corrugated panel. Due to the greater porosity, these alternatives can reduce aerodynamic turbulence. The micro-perforated panel can smooth the air during a backflow event. The micro-perforated panel provides the further benefit of reducing reverberation in the resonator, which also reduces noise.

Figure 3A:
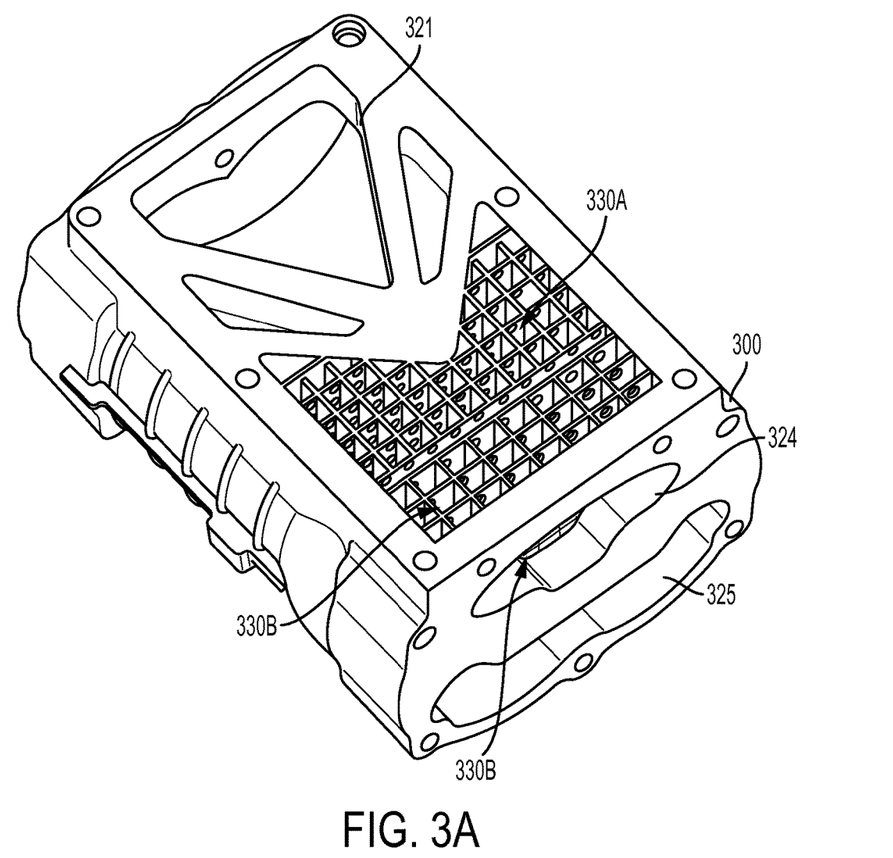
FIGS. 3A-3C are views of an alternative supercharger housing.
Figure 3B:
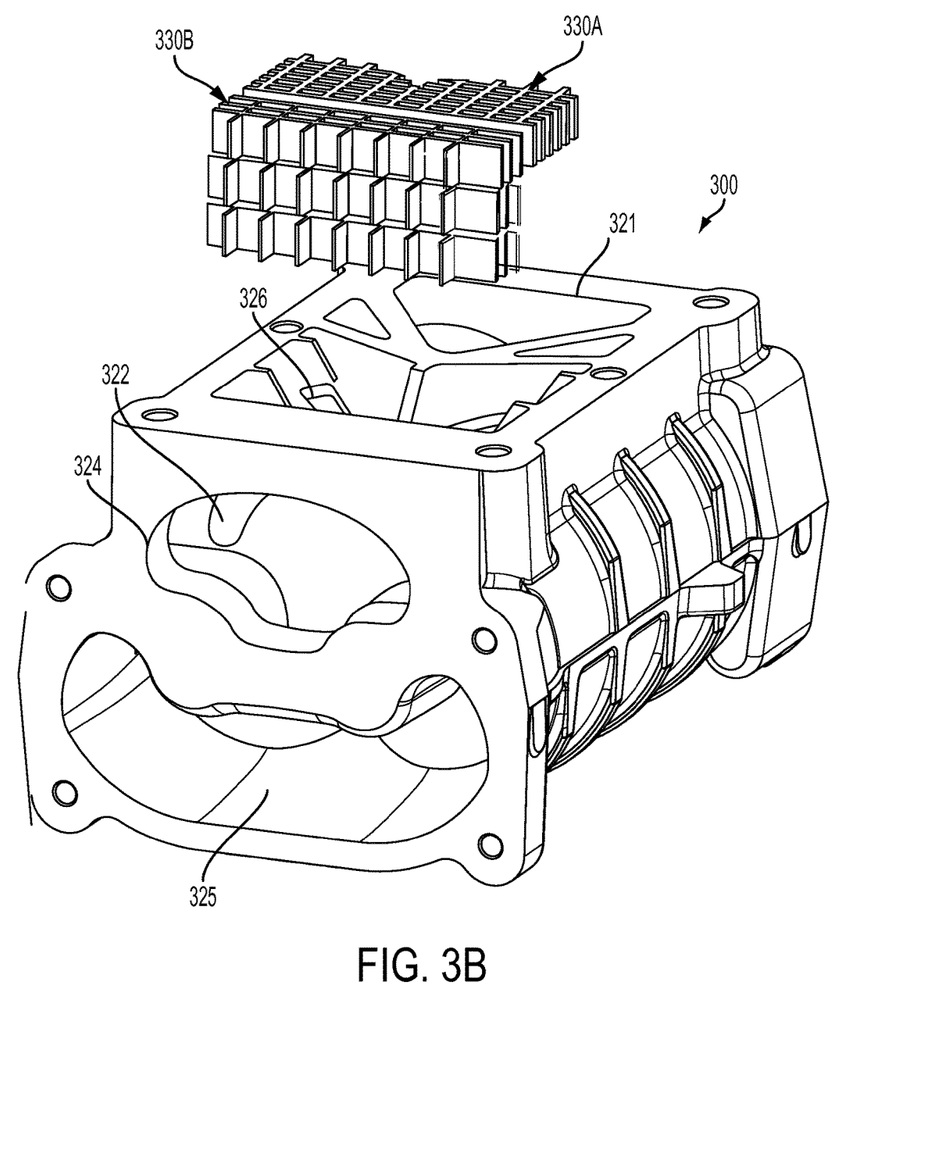
Figure 3C:
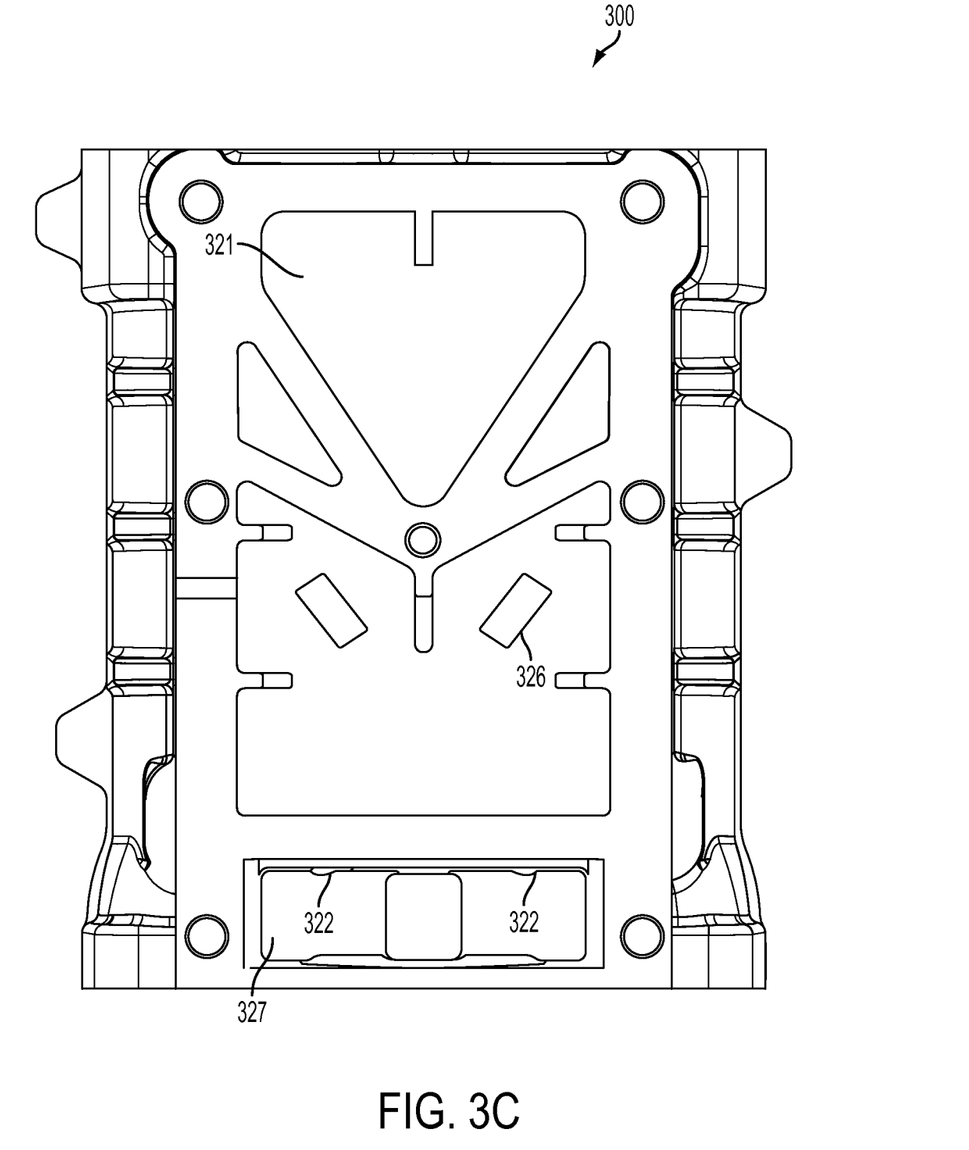
Figure 4A:
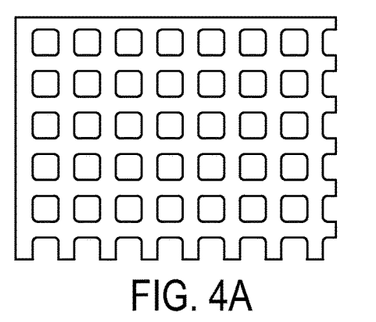
FIGS. 4A-4D are views of alternative perforated materials.
Figure 4B:
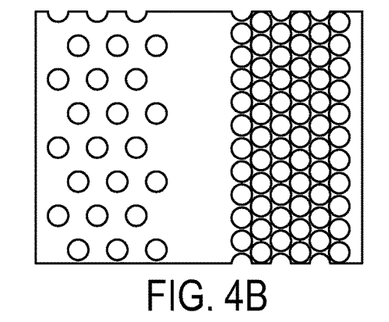
Figure 4C:
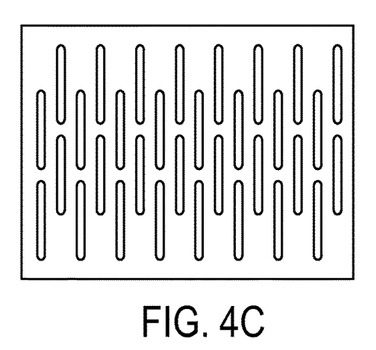
Figure 4D:
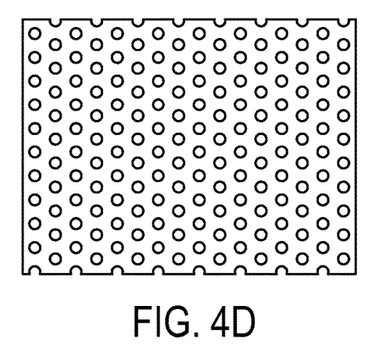

The backflow event to be damped can be through a radial, or outlet side, backflow slot 14, 14A or 14B as shown in FIGS. 1A-1C, or the backflow event can be through an axial inlet backflow port 322 as shown in FIGS. 3A-3C, or both radial backflow ports 326 and axial backflow ports 322. FIG. 3A shows the outlet side of a supercharger housing 300. The triangular outlet 321 expels air to a manifold, such as shown in FIGS. 2C & 2D. The outlet air is cooled by an intercooler and returned to third outlet 210 for circulation within the envelope 100. The cooled air is recirculated in to the supercharger through the radial backflow ports 326 and axial backflow ports 322. A pattern of first baffles 330A is arranged to tailor the flow to radial backflow ports 326. A pattern of second baffles 330B tailors the flow to axial backflow ports 322.

Instead of porting cooled air to the third outlet 210, it is alternatively possible to port the outlet 321 to an intercooler and to seal the baffles to the outlet side of the supercharger 300 as by a lid. Porting from the intercooler can then connect to a flow-tailoring recirculation slot 324 to direct air to axial backflow ports 322 and optional or alternative radial backflow ports 326. The second baffles 330B can extend in to a pocket 327 in the housing of supercharger 300. The pocket can be sealed by a floor from the inlet 325 to prevent backflow air from mixing with inlet air. The pocket 327 itself can be sized and shaped to perform an air-flow smoothing function.

A supercharger assembly can comprise a supercharger housing 300. An inlet plane comprises an inlet 325 and a backflow compartment, or pocket 327. An outlet plane is perpendicular to the inlet plane. The outlet plane comprises an outlet 321. A rotor bore is connected between the inlet 325 and the outlet 321. A pair of axial backflow ports 322 fluidly connect the backflow compartment 327 to the rotor bore. A supercharger outlet resonator comprises a noise-reducing perforated material in the form of baffles 330A & 330B in the backflow compartment 327. The perforated material comprises a pattern in a sheet material, wherein the pattern varies along the sheet material. Alternatively, the noise-reducing material comprises spaced layers of noise-reducing material. Alternatively, the layers of noise-reducing material are at least one of parallel, perpendicular, or intersecting. Alternatively, the noise-reducing material comprises one or more of a micro-perforated panel, a perforated panel, stacked tubular panels, or a corrugated material. Alternatively, the housing further comprises radial backflow ports 326 in the outlet plane arranged in a mirror-image about an outlet center axis C, and wherein the supercharger outlet resonator further comprises a mirror-image set of perforated materials, baffles 330A arranged on either side of the outlet center axis C and adjoined to the radial backflow ports 326. Alternatively, the mirror-image sets of perforated materials comprise planar sheets of material that vary along the length of the outlet center axis C, the variation comprising one of spacing between planar sheets, perforation patterns in the sheets of material, parallel pattern of planar sheets, or perpendicular pattern of planar sheets. Alternatively, the mirror-image sets of perforated materials comprise planar sheets of material arranged askew with respect to the outlet center axis C. Alternatively, the mirror-image sets of perforated materials comprise planar sheets of material arranged parallel with respect to the outlet center axis C. Alternatively, the mirror-image sets of perforated materials comprise planar sheets of material arranged perpendicular with respect to the outlet center axis. Alternatively, the mirror-image sets of perforated materials comprise planar sheets of material arranged askew with respect to the outlet center axis C and wherein the mirror-image sets comprise a first set and a second set, and the first set is one of parallel or perpendicular with respect to the second set. Alternatively, the radial backflow ports 326 comprise a first backflow port pair 14A & 14B and a second backflow port pair 14A & 14B in the outlet plane, wherein the first backflow port pair has mirror-image first port center axis A, wherein the second backflow port pair has mirror-image second port center axis B, and wherein the second port center axis is parallel to the first port center axis. Alternatively, the radial backflow ports 326 comprise a first backflow port pair and a second backflow port pair in the outlet plane, wherein the first backflow port pair has mirror-image first port center axis A, wherein the second backflow port pair has mirror-image second port center axis B, and wherein the second port center axis is askew to the first port center axis C. Alternatively, the second port center axis is one of parallel or askew to the center axis of the outlet. Alternatively, the second port center axis B is one of parallel or askew to the center axis C of the outlet. Alternatively, the noise-reducing perforated material in the backflow compartment comprises a first pattern, wherein the mirror-image set of perforated materials comprise a second pattern, and wherein the first pattern differs from the second pattern. Alternatively, the supercharger assembly comprises a flow-tailoring recirculation slot 324 separated from and above the inlet 325 configured to direct air to the noise-reducing perforated material, baffles 330B, in the backflow compartment, pocket 327. Alternatively, the supercharger assembly comprises a flow-tailoring recirculation slot 324 separated from and above the inlet 325 configured to direct air to the noise-reducing perforated material, baffles 330B, in the backflow compartment and to the mirror-image set of perforated materials, baffles 330A adjoined to the radial backflow ports 326.

Other implementations will be apparent to those skilled in the art from consideration of the specification and practice of the examples disclosed herein. It is intended that the specification and examples be considered as exemplary only, with the true scope of the invention being indicated by the following claims.

What is claimed is:

1. A supercharger outlet resonator comprising:
   a housing;
   a first surface comprising a first opening and a housing axis bisecting the first opening;
   a second surface comprising a second opening, the second surface located parallel to the first surface;
   a channel perpendicular to the housing axis and connecting the first opening to the second opening, the channel comprising at least one sidewall;
   an envelope fluidly separated from the channel by the at least one sidewall, the envelope at least partially surrounding the channel, the envelope extending from the first surface to the second surface, the envelope connected to a backflow port of the supercharger, the envelope comprising:
      a third opening; and
      at least one second sidewall; and
   a noise-reducing material located on the housing.

2. The supercharger outlet resonator of claim 1, wherein the noise-reducing material comprises a perforated material.

3. The supercharger outlet resonator of claim 2, wherein the perforated material comprises a pattern in a sheet material, and wherein the pattern varies along the sheet material.

4. The supercharger outlet resonator of claim 1, wherein the noise-reducing material comprises layers of noise-reducing material.

5. The supercharger outlet resonator of claim 4, wherein the layers comprise a space between the layers.

6. The supercharger outlet resonator of claim 4, wherein the layers of noise-reducing material are at least one of parallel, perpendicular, or intersecting.

7. The supercharger outlet resonator of claim 1, wherein the noise-reducing material comprises one or more of a micro-perforated panel, a perforated panel, stacked tubular panels, or a corrugated material.

8. The supercharger outlet resonator of claim 1, wherein the first opening is triangular.

9. The supercharger outlet resonator of claim 1, further comprising a backwall.

10. The supercharger outlet resonator of claim 1, wherein the envelope is at least partially V-shaped.

11. The supercharger outlet resonator of claim 1, wherein the noise-reducing material comprises one or both of a gasket adjoining the first surface and a sealant in a tray proximal to the first opening.

12. The supercharger outlet resonator of claim 1, wherein the noise-reducing material comprises a coating on the at least one sidewall of the channel, and the coating comprises one of an absorber material, an aluminum coating, a laminated material, or a combination of a laminated material and an adhesive.

13. The supercharger outlet resonator of claim 1, wherein the noise-reducing material comprises a mirror-image set of perforated materials arranged on either side of the housing axis.

14. The supercharger outlet resonator of claim 13, wherein the mirror-image sets of perforated materials comprise planar sheets of material that vary along the length of the housing axis, the variation comprising one of spacing between planar sheets, perforation patterns in the sheets of material, parallel pattern of planar sheets, or perpendicular pattern of planar sheets.

15. The supercharger outlet resonator of claim 13, wherein the mirror-image sets of perforated materials comprise planar sheets of material arranged askew with respect to the housing axis.

16. The supercharger outlet resonator of claim 13, wherein the mirror-image sets of perforated materials comprise planar sheets of material arranged parallel with respect to the housing axis.

17. The supercharger outlet resonator of claim 13, wherein the mirror-image sets of perforated materials comprise planar sheets of material arranged perpendicular with respect to the housing axis.

18. The supercharger outlet resonator of claim 13, wherein the mirror-image sets of perforated materials comprise planar sheets of material arranged askew with respect to the housing axis and wherein the mirror-image sets comprise a first set and a second set, and the first set is one of parallel or perpendicular with respect to the second set.

19. A supercharger assembly comprising:
    a supercharger, wherein the supercharger comprises:
       a housing, the housing comprising:
          an axial inlet;
          a radial outlet;

a rotor bore connected between the axial inlet and the radial outlet; and at least one pair of backflow ports adjacent one of the axial inlet or the radial outlet, the at least one pair of backflow ports fluidly connected to the rotor bore;

a supercharger outlet resonator adjoined to the supercharger adjacent the radial outlet, the supercharger outlet resonator comprising:

a housing;

a first surface comprising a first opening and a housing axis bisecting the first opening, the first opening coupled to the outlet;

a second surface comprising a second opening, the second surface located parallel to the first surface;

a channel perpendicular to the housing axis and connecting the first opening to the second opening, the channel comprising at least one sidewall;

an envelope fluidly separated from the channel by the at least one sidewall, the envelope at least partially surrounding the channel, the envelope extending from the first surface to the second surface, the envelope comprising:

a third opening; and at least one second sidewall; and a noise-reducing material located on the housing.

20. The supercharger assembly of claim 19, further comprising an intercooler connected to receive air from the second opening and connected to return air to the third opening.

21. The supercharger assembly of claim 20, wherein the noise-reducing material is arranged so that air returned to the third opening traverses the noise-reducing material to reach the at least one pair of backflow ports.

22. The supercharger assembly of claim 19, wherein the at least one pair of backflow ports are arranged in a mirror-image about a center axis of the radial outlet and comprise a first backflow port pair and a second backflow port pair adjacent the radial outlet, wherein the first backflow port pair has a mirror-image first port center axis, wherein the second backflow port pair has a mirror-image second port center axis, and wherein the second port center axis is parallel to the first port center axis.

23. The supercharger assembly of claim 19, wherein the at least one pair of backflow ports are arranged in a mirror-image about a center axis of the radial outlet and comprise a first backflow port pair and a second backflow port pair adjacent the radial outlet, wherein the first backflow port pair has a mirror-image first port center axis, wherein the second backflow port pair has a mirror-image second port center axis, and wherein the second port center axis is askew to the first port center axis.

24. The supercharger assembly of one of claim 22, wherein the noise-reducing material comprises a mirror-image set of sheets of perforated materials arranged on either side of the housing axis, and wherein the sheets are arranged parallel to one of the first port center axis or the second port center axis.

25. The supercharger assembly of one of claim 22, wherein the noise-reducing material comprises a mirror-image set of sheets of perforated materials arranged on either side of the housing axis, and wherein the sheets are arranged perpendicular to one of the first port center axis or the second port center axis.

26. The supercharger assembly of one of claim 22, wherein the noise-reducing material comprises a mirror-image set of intersecting sheets of perforated materials arranged on either side of the housing axis, and wherein the intersecting sheets are arranged so that a first set of the sheets are parallel to one of the first port center axis or the second port center axis, and so that a second set of the sheets are perpendicular to one of the first port center axis or the second port center axis.

27. The supercharger assembly of one of claim 23, wherein the noise-reducing material comprises a mirror-image set of sheets of perforated materials arranged on either side of the housing axis, and wherein the sheets are arranged parallel to one of the first port center axis or the second port center axis.

28. The supercharger assembly of one of claim 23, wherein the noise-reducing material comprises a mirror-image set of sheets of perforated materials arranged on either side of the housing axis, and wherein the sheets are arranged perpendicular to one of the first port center axis or the second port center axis.

29. The supercharger assembly of one of claim 23, wherein the noise-reducing material comprises a mirror-image set of intersecting sheets of perforated materials arranged on either side of the housing axis, and wherein the intersecting sheets are arranged so that a first set of the sheets are parallel to one of the first port center axis or the second port center axis, and so that a second set of the sheets are perpendicular to one of the first port center axis or the second port center axis.

* * * * *